Patented July 22, 1952

2,604,456

UNITED STATES PATENT OFFICE 2,604,456

PROCESS FOR SULFONATING POLYSTYRENE

Rudolf Signer, Gumligen, near Berne, Switzerland

No Drawing. Application July 5, 1950, Serial No. 172,190. In Switzerland July 7, 1949

5 Claims. (Cl. 260—29.6)

It has been found that sulphonic acids of high molecular weight, which as free acids, or in the form of their alkali metal salts give a clear solution in water, are produced when polystyrol, preferably in the presence of solvents, is treated with addition compounds of sulphuric anhydride on organic substances. As components for such addition compounds cyclic ethers are particularly suitable, such as dioxane and thioxane. As solvents it is preferable to employ chlorinated aliphatic hydrocarbons, such for example as carbon tetrachloride, ethylene, dichloride, or ethane tetrachloride.

The product of polystyrol sulphonic acids by the action of sulphonating means, such as sulphuric acid, oleum and chlorosulphonic acid, upon polystyrol is known. The polystyrol sulphonic acids produced by this process do not give a clear solution in water, either as free acids or in the form of their alkali metal salts. They swell considerably in water. Suspensions of the swollen substances in water cannot be filtered. Very coarse filters with pores of the size of $200\mu$ are quickly choked completely by the gel lumps. From very dilute solutions after standing for a long time, the swollen particles of the polystyrol sulphonic acids or their salts settle as voluminous precipitates. For many purposes this is a great disadvantage, and it is therefore of particular importance that by the process according to the present invention, polystyrol, sulphonic acids are obtained which give clear solutions in water as free acids or as alkali metal salts. The aqueous solutions of the acids and of the alkali metal salts can be filtered through fine filters with a size of pore of $20\mu$ without any choking of the filter. A deposition of the particles dissolved in water does not take place even after long standing.

The difference in the properties of the polystyrol sulphonic acids obtained by the known processes and those obtained by the new process according to the invention is to be explained by the fact that according to the known process, when sulphonating, not only sulphonic acid groups but also sulpho groups are obtained, which "knit" the polystyrols together and therefore give rise only to compounds capable of swelling in water but not to compounds giving a clear solution in water.

The production of sulphonic acids by the treatment of aromatic hydrocarbons of low molecular weight with the addition product of sulphuric anhydride on dioxane is already known. It was however by no means to be expected, and is indeed very surprising, that with polystyrol, transposition products clearly soluble in water are obtained only when sulphonation is effected with addition compounds of sulphuric anhydride on organic compounds such as dioxane or thioxane.

The new sulphonic acids of high molecular weight are very good protective colloids, and can be easily obtained even in large quantities in a colourless form. They may be employed for instance for improving the properties of detergents, for the fine distribution of dyestuffs or germicides in water, or for the production of dressings and of leather dyes. If polystyrol of particularly high molecular weight is employed, sulphonic acids are obtained of which the alkali metal salts are very suitable for the production of thickening agents for printing on cloth.

Example 1

Into a mixture of 11 parts by weight of dioxane and 40 parts by volume of carbon tetrachloride are slowly introduced with cooling, 10 parts by weight of sulphuric anhydride. There is then formed, with great evolution of heat, and precipitated, the addition compound of 1 mol. $SO_3$ to 1 mol dioxane. To this mixture 15 parts by weight of polystyrol dissolved in 40 parts by volume of carbon tetrachloride are added, and are thoroughly mixed at room temperature for some hours. After the addition of water the mixture is separated by centrifuging into two layers. The lower layer, consisting of the carbon tetrachloride and part of the dioxane employed, is drawn off. The aqueous layer contains the polystyrol sulphonic acid, which is evaporated to dryness either directly or after conversion into the sodium salt by the addition of soda lye.

The free sulphonic acid and the sodium salt give a clear solution in water. The aqueous solutions are viscous and colourless.

Instead of dioxane, thioxane may be employed with the same result.

Example 2

Into a mixture of 22 parts by weight of dioxane and 30 parts by volume of ethane tetrachloride are slowly introduced, with cooling, 10 parts by weight of sulphuric anhydride. To this mixture are added 22 parts by weight of polystyrol, dissolved in 65 parts by volume of ethane tetrachloride and thoroughly mixed together for 20 hours. At a temperature between 40 and 50 degrees centigrade the dioxane and part of the ethane tetrachloride are thereupon distilled off in a vacuum. This mixture of solvents may be used again for the next batch. The residual reaction mixture is then mixed with water and neutralized with soda lye, with cooling. The ethane tetrachloride is distilled with steam and the viscous colourless solution remaining behind is evaporated. The sodium salt of a polystyrol sulphonic acid which gives a solution in water is obtained.

With this example also, thioxane may be employed in place of dioxane.

Example 3

Into a mixture of 9 parts by weight of dioxane and 40 parts by weight of ethylene dichloride are introduced 6.9 parts by weight of sulphuric anhydride, with cooling. To this mixture are added 45 parts by weight of polystyrol dissolved in 150 parts by weight of ethylene dichloride, these being thoroughly mixed together for 6 hours.

The reaction mixture is treated with the same volume of methanol and mechanically mixed, a homogeneous solution being obtained. In a vacuum of 15 mm. at a temperature of 40° C. the organic solvents are distilled off from this solution, the same volume of water being at the same time added by drops, so that after the termination of the distillation an aqueous solution of a polystyrol containing a few sulphonic acid groups is obtained. This is neutralized with lye when an aqueous solution of the salt is needed. The aqueous solutions of these low sulphonated acids and salts have the property of separating the dissolved material, after evaporation and drying, in a form which is insoluble in water.

The same compounds are obtained if thioxane is employed instead of dioxane.

I claim:

1. A process for the production of polystyrol sulphonic acids which give a clear solution in water as alkali metal salts, consisting in treating polystyrol, at approximately room temperature, with addition compounds of sulphuric anhydride on cyclic ethers of the group consisting of dioxane and thioxane.

2. A process for the production of polystyrol sulphonic acids which give a clear solution in water as alkali metal salts, consisting in treating polystyrol, at approximately room temperature, with the addition product of sulphuric anhydride on dioxane.

3. A process for the production of polystyrol sulphonic acids which give a clear solution in water as alkali metal salts, consisting in treating polystyrol, at approximately room temperature, with the addition product of sulphuric anhydride on thioxane.

4. A process for the production of polystyrol sulphonic acids which give a clear solution in water as alkali metal salts, consisting in carrying out the reaction of the polystyrol with an addition compound of sulphuric anhydride on a cyclic ether of the group consisting of dioxane and thioxane in the presence of a chlorinated aliphatic hydrocarbon as solvent, said reaction being carried out at approximately room temperature.

5. A process for the production of polystyrol sulphonic acids as claimed in claim 4, consisting in thoroughly mixing the reaction mixture with an equal volume of methanol, then distilling off the organic solvents and at the same time adding an equal volume of water, so that after the termination of the distillation an aqueous solution of a polystyrol sulphonic acid is obtained.

RUDOLF SIGNER.

REFERENCES CITED

The following references are of record in the file of this patent:

UNITED STATES PATENTS

| Number | Name | Date |
|---|---|---|
| 2,533,211 | Baer | Dec. 12, 1950 |

FOREIGN PATENTS

| Number | Country | Date |
|---|---|---|
| 580,366 | Germany | July 13, 1933 |

OTHER REFERENCES

Suter: J. Am. Chem. Soc., 60, 538–40 (1938).